March 26, 1968         J. S. SENEY         3,375,347
HEATER CONTROL CIRCUIT
Filed June 10, 1965                                   3 Sheets-Sheet 1
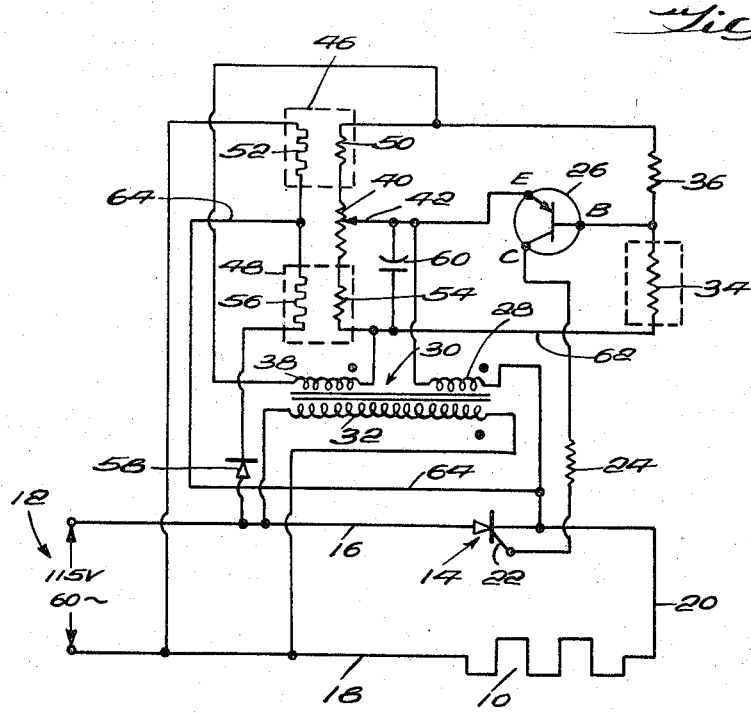
Fig. 1.
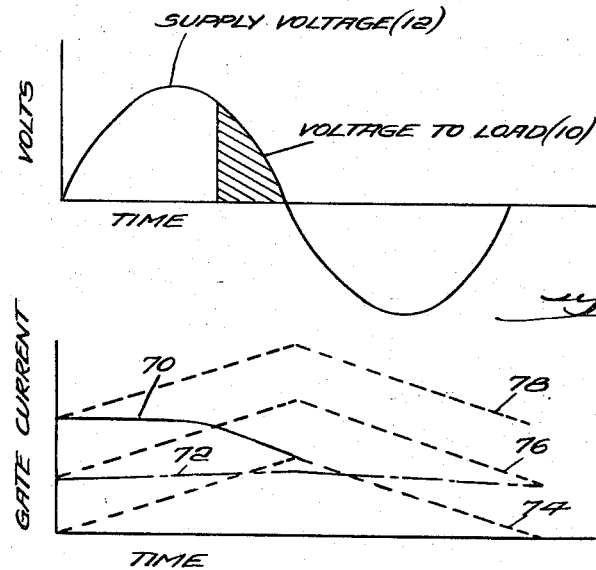
Fig. 2.
Fig. 3.

March 26, 1968  J. S. SENEY  3,375,347
HEATER CONTROL CIRCUIT

Filed June 10, 1965  3 Sheets-Sheet 2

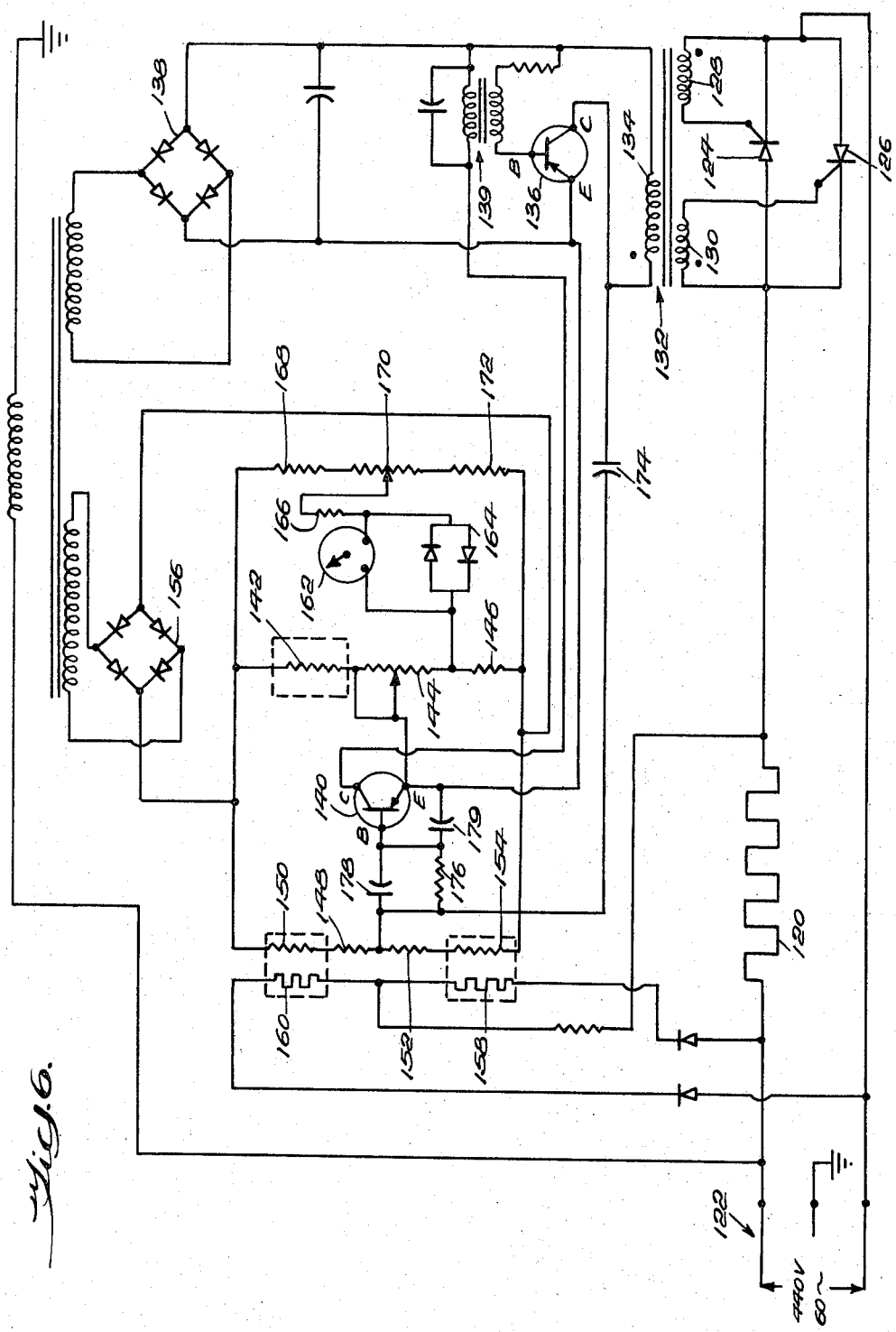

United States Patent Office 3,375,347
Patented Mar. 26, 1968

3,375,347
HEATER CONTROL CIRCUIT
John Seymour Seney, Seaford, Del., assignor to E. I. du Pont de Nemours and Company, Wilmington, Del., a corporation of Delaware
Filed June 10, 1965, Ser. No. 462,884
6 Claims. (Cl. 219—499)

ABSTRACT OF THE DISCLOSURE

A heater control circuit in which a temperature sensing bridge with an auxiliary capacitor provides proportional control to the gate of a silicon controlled rectifier having its anode and cathode series connected with a heater to a source of alternating current.

This invention relates to automatic condition control systems and particularly to circuitry and components, including solid state electronic elements, for precisely controlling the temperature of an electrically heated apparatus. The heater circuits disclosed herein have shown outstanding utility in connection with precise temperature control of the hot pins, plates and jets employed in connection with treatment of textile yarn such as nylon, especially in situations where a large number of closely spaced processing positions necessitates many small size, low cost, precision, temperature controls.

A temperature control device employing a phase control circuit for A.C. loads is described in the "Silicon Controlled Rectifier Manual," second edition (1961), pp. 117 and 118, published by the General Electric Co. It is very satisfactory for many applications but has insufficient sensitivity for others. In addition, its cost is high and it has an additional disadvantage in that the heater would be held fully energized in the event of a sensor failure, i.e., the circuit is not "fail safe."

The object of this invention is to provide a highly sensitive, low cost, precise, temperature controller having no moving contacts. A corollary objective is to provide an efficient, electric, heater circuit with both proportional control and anticipating anti-hunt characteristics.

These objectives are achieved in a heater circuit which has a silicon controlled rectifier series connected with an electric heater to a supply of alternating current. Electrically coupled with the power supply, there is a resistance bridge having in one of its legs a temperature responsive resistor which is thermally associated with the heater. A transistor has its base and emitter connected across the bridge whereas its emitter and collector are connected to gate control circuitry which has output leads connected to the cathode and gate of the rectifier and also is coupled electrically with the power supply. Connected directly to the emitter, there is a phasing capacitor. Anticipating anti-hunt characteristics are achieved by including an additional pair of opposed equal resistors in the bridge and a high resistance heater coil thermally associated with each of the opposed resistors, one of the coils being connected to the power supply for half-wave excitation when the rectifier is conducting, the other coil being connected to the power supply for half-wave excitation when the rectifier is nonconducting.

Other objectives and advantages will become apparent in the following specification wherein reference is made to the accompanying drawings in which:

FIGURE 1 is a circuit diagram of the basic half-wave temperature controller;

FIGS. 2 and 3 are comparative sketches showing gating current and heater voltage relationships which give proportional control;

FIG. 6 is a circuit diagram of an alternate embodiment adapted for use with a heater having high power requirements.

Figure 4:
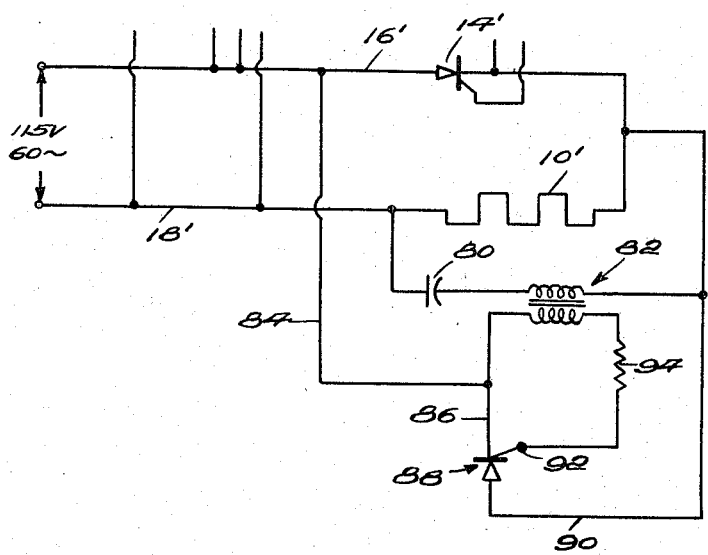
FIG. 4 is a fragmentary diagram of the circuit shown in FIG. 1 with additional components which provide full wave proportional control.

In the half-wave embodiment of FIG. 1, an electric heater 10 is connected in series with an A.C. power source 12 and a silicon controlled rectifier device 14, with one line 16 from the source connected to the anode of SCR 14 and another line 18 connected directly to the heater. The other side of heater 10 is connected over line 20 to the cathode of SCR 14 which has its gate 22 connected through current limiting resistor 24 to the collector of a transistor 26. The emitter of transistor 26 is connected to one side of a first secondary winding 28 of a transformer 30, the primary winding 32 of which is connected across lines 16 and 18 of power source 12. The other side of secondary winding 28 is connected to the cathode of SCR 14, thus providing a complete gating circuit through transistor 26. The base of transistor 26 is connected to the output terminal between two bridge resistors 34 and 36, the free ends of which are connected to the bridge input terminals. The latter, in turn, are connected to the ends of a second secondary winding 38 of transformer 30 as well as to the outside terminals of a voltage divider resistor 40. The sliding contact 42 of resistor 40 is connected to the emitter terminal of transistor 26. Resistor 34 is made of resistance wire with a high temperature coefficient of resistance. This resistance coil is used as a temperature sensor and is located, along with heater 10, in the controlled apparatus.

In operation, sliding contact 42 is adjusted to set the temperature at which the controller is to operate. Resistors 34, 36 and the two sides of resistor 40 form a resistance bridge which is in balance when resistor 34 is at the desired temperature. When resistor 34 is at a lower temperature, there will be a potential difference across the bridge and, therefore, between the emitter and base of transistor 26, thus allowing a current to flow from transformer secondary 28 and through the gating circuit of SCR 14. This current flows from the emitter to the collector of transistor 26 and through limiting resistor 24 to gate 22. Its magnitude depends on the deviation of temperature from set point. If the current is equal to or above a critical value, SCR 14 will fire and transmit to heater 10 through the positive half cycle of the AC power supply. When the AC supply voltage reverses, the SCR is turned off, i.e., no power flows during the negative half cycle. As the temperature of the apparatus under control rises, the temperature and therefore the resistance of resistor 34 rises and the bridge approaches balance. At or near bridge balance, the potential difference between the emitter and base of transistor 26 reduces to a level below which only a very small current is allowed to pass between the emitter and collector. When that level is insufficient to provide the requisite gating current for SCR 14, no power will be supplied to heater 10. If the temperature should drift above the desired temperature, resistor 34 will continue to increase in resistance, the gate will continue to receive insufficient current to fire SCR 14 and heater power will remain off. Furthermore, if resistor 34 should burn out, causing an open circuit in that leg of the bridge, the gating current would continue to be too low to fire the SCR. In this respect, the controller can be regarded as "fail safe."

The anticipating anti-hunt circuit has two biasing assemblies 46, 48 in which corresponding elements have equal characteristics. Assembly 46 comprises a trimming or biasing resistor 50 and a high resistance heater 52.

Assembly 48 comprises a biasing resistor 54 and a high resistance heater 56. Resistors 50, 54 are wound with high temperature coefficient of resistance material around heaters 52, 56, respectively, and series connected to the respective ends of variable resistor 40. Heaters 52, 56 are connected in series, with the free ends of heater 52 connected to line 18 of power supply 12. A lead from the other supply line 16 is connected through semi-conductor diode 58 to the free end of heater 56. The midpoint between heaters 52, 56 is connected by line 64 to the cathode of SCR 14. In a test embodiment, heater 10 had 600 ohms of resistance, heaters 52, 56 each had 10,000 ohms of resistance and resistors 50, 54 had nominal resistances of 30 ohms.

In operation, the anticipating anti-hunt circuit provides changes in the resistance of biasing or trimmer resistors 50, 54 depending on whether or not SCR 14 is conducting. When SCR 14 is conducting, current passes from line 16 through SCR 14, along line 64 to the midpoint between heaters 52, 56. Because of diode 58, no current will pass through heater 56, but there is a circuit through heater 52 to line 18 of the power supply. In this way, heater 52 will increase the temperature and therefore the resistance of resistor 50 and so bias the bridge as to decrease current flow in the gating circuit. Thus, the power supply to heater 10 will be turned off a little before the sensed temperature has actually arrived at set point. If SCR 14 is not conducting because of insufficient gate firing current, the positive half cycle of the power supply will then pass from line 16 through diode 58, heater 56, along line 64, through heater 10 and out line 18. This raises the temperature of biasing resistor 54, setting the bridge out of balance in the direction to provide higher gating current and therefore turn SCR 14 on.

In this manner, when temperature is rising during a heating cycle, the power will be turned off before control temperature is reached to minimize overshoot. When power to heater 10 is turned off and the apparatus being controlled is cooling, the heat will be turned on earlier than would be provided by the basic circuit, thus preventing a drop in temperature too far below set point before heat is turned on.

Effective and efficient proportional control of power application to heater 10 is achieved by providing a capacitor 60 which is connected directly between the emitter of transistor 26 and line 62. Line 62 is the bridge input connection to resistor 34. The effect of capacitor 60 has been shown by comparative graphs. In FIG. 2, the supply voltage is plotted against time as a typical sine wave curve for AC voltage. In FIG. 3, the gate current for SCR 14 is plotted against the same time scale and during the same period. In this latter diagram, curve 70 is an experimentally determined limiting curve for gate current below which the SCR will not fire and above which level of current the gate will operate the SCR. Without capacitor 60, the alternating current flow through transistor 26 has a flattened wave form which has been represented in FIG. 3 by a broken line 72. When the temperature becomes more and more below the control temperature, potential across the bridge rises, i.e., the level of curve 72 rises until it is high enough to intersect curve 70, at which time the gate current will be sufficient to fire SCR 14. There will be only a very slight proportioning effect due to the droop in curve 70. However, when capacitor 60 is connected as shown in FIG. 1, a phased current flows through transistor 26 which is approximately 90° leading with respect to the power supply. Thus, gate current during the positive half cycle of the supply voltage will rise along a relatively straight line such as 74, 76 or 78 depending on how far the bridge is out of balance. If the bridge is at balance such that line 74 applies, the gate current will not rise to a sufficient level to fire SCR 14 during the positive half cycle of the supply voltage and therefore no power will be supplied to the heater 10. As the temperature begins to fall below the set point, gate current will follow lines such as 78 or an intermediate line such as 76. These lines intersect the critical firing current curve 70 at points along that line as illustrated by the intersection of line 76 with line 70. When the gating current reaches the value at the intersection, SCR 14 will be turned on. As shown in FIG. 2, this occurs after the supply voltage has passed through part of its positive half cycle. Thus, power will be supplied to heater 10 for only the shaded portion of the positive half cycle of supply voltage. The fraction of the positive half cycle which is applied to heater 10 will be proportional to the magnitude of the bridge imbalance or error signal since this magnitude determines the current level from which curves such as 74, 76 or 78 start their upward climb during the positive half cycle of supply voltage and consequently the phase delay before the SCR is turned on. Thus, by this phase delay arrangement, the controller provides proportional power depending on the amount that the temperature of the apparatus has fallen below the control or set point.

FIG. 4 shows a simple circuit designed to provide full wave control of power when added to the circuit of FIG. 1. In this full wave embodiment, a capacitor 80 is added with one side connected to line 18' of the power supply and the other side through the primary of a transformer 82 and thence to the cathode of SCR 14'. The secondary of transformer 82 is connected over line 84 to the other power supply line 16' and over line 86 to the cathode of a second SCR 88, the anode of which is connected over line 90 to the cathode of SCR 14'. Gate terminal 92 of SCR 88 is connected through current limiting resistor 94 to the secondary winding of transformer 82, thus completing this auxiliary circuit.

In operation, capacitor 80 is charged when current flows through heater 10' during the positive half cycle and discharges in time to provide for gating of SCR 88 during the negative half cycle through the gating circuit comprised of the secondary of transformer 82 and resistor 94. Thus, the firing of SCR 88 is timed so that it passes power during the negative half cycle whenever SCR 14' has passed power during the positive half cycle. When this auxiliary circuit is employed with the controller of FIG. 1, a diode 58 must be placed in both line connections to anti-hunt heaters 52, 56 in the same manner as in FIG. 6.

Figure 5:
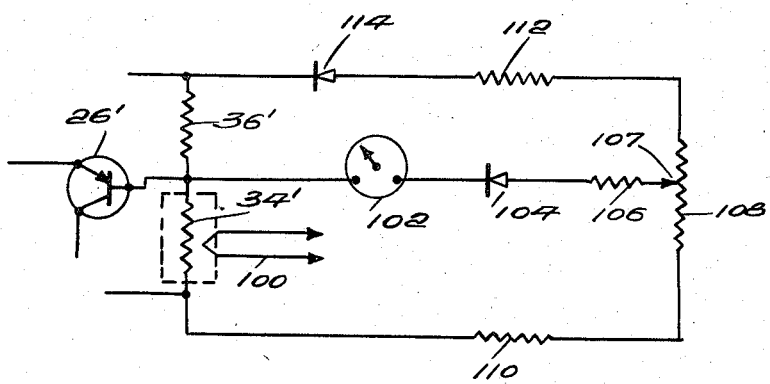
FIG. 5 is another fragmentary diagram of the circuit shown in FIG. 1 with optional components for visual read-out, calibration and recording.

Auxiliary circuitry which provides recording and metering connections has been shown in FIG. 5 and includes a thermocouple 100 associated with the sensing resistor 34'. Thermocouple 100 may be connected to a potentiometer for calibrating the controller or may be connected to a recording potentiometer for recording temperature during operation of the controller. In addition, an indicating biased meter 102 is provided with one terminal connected to the bridge output terminal between resistors 34' and 36' and the other terminal connected through a diode 104 and through meter range calibration resistor 106 to the variable contact 107 of a voltage divider resistor 108 which is used to adjust the span bias of meter 102. One terminal of resistor 108 connects through resistor 112 and diode 114 to one of the bridge input terminals while the other end of resistor 108 is connected through resistor 110 to the other bridge input terminal.

When the apparatus whose temperature is to be controlled requires greater than about 1,000 watts power in the electric heater, the circuit embodiment shown in FIG. 6 has been found desirable. Here, a high wattage resistance heater 120 is energized from high voltage power supply 122 under control of two silicon controlled rectifiers 124, 126 wired back-to-back with gating circuits energized through secondary windings 128 and 130 of transformer 132 which has a primary winding 134. Secondary windings 128 and 130 are wound in opposite directions to provide the required difference in polarity in the gating circuits of rectifiers 124, 126. Excitation of primary 134 is furnished from a bridge rectifier 138 under control of transistor 136. Transistor 136 is controlled by signals across its base and emitter terminals as received from transformer 139 which in turn receives signals from the collector of a transistor 140 located in the temperature sensing bridge circuit comprising temperature sensing resistor 142 and resistors 144, 146, 148, 150, 152, 154. The input terminals of this bridge are connected to a diode bridge rectifier 156. Anticipating anti-hunt characteristics are provided by heaters 158 and 160 which correspond to heaters 52, 56 in FIG. 1 and are thermally associated with opposed identical resistors 154, 150. An indicating biased meter assembly is provided by meter 162, diode assembly 164 and a resistance network containing resistors 166, 168, 170 and 172. An important additional feature of this circuit comprises the provision of a type of regenerative feedback resulting from the inclusion of capacitor 174 connected between the collector terminal of transistor 136 and the base terminal of transistor 140 through the RC circuit comprising resistor 176 and capacitor 178. A charging capacitor 179 is connected directly to the emitter of transistor 140 just as capacitor 60 is connected directly to transistor 26 in FIG. 1. This control circuit provides the controller with a very high degree of sensitivity.

In the disclosed embodiments, a precision temperature control device employing a phase control switching circuit for AC loads incorporates anticipating anti-hunt and proportional control features. All switching elements are solid state types such that no moving contacts are necessary. Since the circuits are comparatively simple and the components relatively inexpensive, the total cost for either controller is much lower than for known devices of this type.

It is apparent that many modifications may be made to the disclosed controller circuits by one skilled in the art without departing from the spirit of the invention which is, therefore, intended to be limited only by the scope of the appended claims.

Having thus described the invention, what is claimed as new and desired to be secured by Letters Patent is:

1. A heater circuit comprising: an alternating current power supply; a silicon controlled rectifier having a cathode, an anode and a gate; a heater connected in series with said rectifier across the power supply; a resistance bridge coupled electrically to said power supply and having in one of its legs a temperature responsive resistor thermally associated with said heater; a transistor having a base, an emitter and a collector, said base and the emitter being connected across the bridge; gate control circuitry coupled electrically to said power supply, said circuitry having input leads connected to the emitter and collector of said transistor and output leads connected to the cathode and gate of said rectifier; and a capacitor connected directly to said emitter.

2. The heater circuit of claim 1 wherein said bridge and said gate control circuitry are coupled electrically with said power supply through transformer means including a pair of secondary windings and wherein said gate control circuitry includes a limiting resistor between the leads connected to said collector and the gate and has one of said secondary windings between the other input and output leads.

3. The heater circuit of claim 1 wherein is provided a second silicon controlled rectifier connected back-to-back in parallel with the first rectifier and having a gate circuit coupled electrically with said power supply, said gate circuit including a phasing capacitor.

4. A heater circuit comprising: an alternating current power supply; a first silicon controlled rectifier having a cathode, an anode and a gate; a heater connected in series with said rectifier across the power supply; a resistance bridge coupled electrically to said power supply and having in one of its legs a temperature responsive resistor thermally associated with said heater; a transistor having a base, an emitter and a collector, said base and the emitter being connected across the bridge; gate control circuitry coupled electrically to said power supply, said circuitry having input leads connected to the emitter and collector of said transistor and output leads connected to the cathode and gate of said first rectifier; a capacitor connected directly to said emitter; and a second silicon controlled rectifier connected back-to-back in parallel with the first rectifier, said gate control circuitry comprising a second transistor and transformer means including a pair of oppositely wound secondary windings, said second transistor having a base and an emitter coupled electrically to said input leads and a collector connected to said transformer means, there being output leads connecting each secondary winding to the cathode and gate of one of said rectifiers.

5. A heater circuit comprising: an alternating current power supply; a silicon controlled rectifier having an anode, a cathode and a gate; a heater connected in series with said anode and cathode across the power supply; a resistance bridge coupled electrically to said power supply and having in one of its legs a temperature responsive resistor thermally associated with said heater; a transistor having a base, an emitter and a collector, said base and the emitter being connected across the bridge; gate control circuitry coupled electrically to said power supply, said circuitry having input leads connected to the emitter and collector of said transistor and output leads connected to the cathode and gate of said rectifier; a capacitor connected directly to said emitter; and anticipating anti-hunt means associated with said bridge, said anti-hunt means comprising a pair of opposed equal resistors in said bridge, a high resistance heater thermally associated with each of said opposed resistors, one of said heaters being connected to the power supply for half wave excitation when the rectifier is conducting, the other heater being connected to the power suply for half wave excitation when the rectifier is nonconducting.

6. A heater circuit comprising: an alternating current power supply; a silicon controlled rectifier having a gate; a heater connected in series with said rectifier across the power supply; a resistance bridge having in one of its legs a temperature responsive resistor thermally associated with said heater; a bridge transistor having a base, an emitter and a collector, said base being connected to the temperature responsive resistor, said emitter having a lead extending across the bridge to the opposed resistance; a capacitor connected to said lead for charging the emitter; and control circuitry coupling said collector with said gate.

References Cited

UNITED STATES PATENTS

| 3,149,224 | 9/1964 | Horne et al. | |
| 3,161,759 | 12/1964 | Gambill et al. | |
| 3,299,344 | 1/1967 | Werts | 219—499 |
| 3,299,345 | 1/1967 | Werts | 219—499 |
| 3,259,825 | 7/1966 | James | 219—501 X |

OTHER REFERENCES

SCR Manual, General Electric Co., second edition (1961), pp. 117 and 118.

RICHARD M. WOOD, Primary Examiner.

L. H. BENDER, Assistant Examiner.